(12) United States Patent
Burns et al.

(10) Patent No.: US 7,805,533 B2
(45) Date of Patent: Sep. 28, 2010

(54) METHODS AND MEDIA FOR A PROTOCOL ABSTRACTION LAYER FOR INFORMATION HANDLING SYSTEMS

(75) Inventors: Ross Kevin Burns, Cedar Park, TX (US); Thomas T. O'Connell, Dexter, NY (US); Sudhir Shetty, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 78 days.

(21) Appl. No.: 12/128,594

(22) Filed: May 28, 2008

(65) Prior Publication Data

US 2009/0300199 A1  Dec. 3, 2009

(51) Int. Cl.
*G06F 15/16* (2006.01)
(52) U.S. Cl. .................. 709/230; 709/227; 709/237; 709/217; 709/223; 709/225; 714/4; 707/758; 707/783; 707/626; 707/635; 707/637
(58) Field of Classification Search .................. 709/228, 709/219, 203, 230, 227, 237, 217, 223, 225
See application file for complete search history.

(56) References Cited

U.S. PATENT DOCUMENTS

| 7,272,836 B1 | 9/2007 | Taylor | |
| 2004/0243668 A1* | 12/2004 | Harjanto | 709/203 |
| 2006/0179125 A1* | 8/2006 | Pavlik et al. | 709/219 |

* cited by examiner

*Primary Examiner*—Jude J Jean Gilles
(74) *Attorney, Agent, or Firm*—Garrana Tran, LLP

(57) ABSTRACT

A method for communicating with remote devices wherein the method includes sending a request through an application programming interface (API), formatting the request and routing the request to a first connection associated with a first protocol. The method further includes mapping the request into a first command, wherein the first command conforms to the first protocol and sending the first command to a remote device.

25 Claims, 12 Drawing Sheets

```xml
<?xml version="1.0" encoding="utf-8" ?>
<session id="{server_device_sessions_GUID}">
  <trySession name="Server Session Configuration 1" id="{Session 1 Config GUID}" tryOrder="1">
    <connection name="OMSA" id="{OMSA Connection 1 GUID}"
      connectionClass="server" tryOrder="1" required="yes" onDemand="yes" />
    <connection name="OMSS" id="{OMSS Connection 1 GUID}"
      connectionClass="storage" required="no" onDemand="yes" />
    <connection name="DRAC" id="{DRAC Connection 1 GUID}"
      connectionClass="remoteAccess" required="no" onDemand="no" />
    <connection name="Win32_PerfMon" id="{Perfmon Connection 1 GUID}"
      connectionClass="perfmon" required="no" onDemand="yes" />
  </trySession>
  <trySession name="Server Session Configuration 2" id="{Session 2 Config GUID}" tryOrder="2">
    <connection name="OMSA Profile A" id="{Profile A GUID}"
      connectionClass="server" tryOrder="1" required="yes" onDemand="no" />
    <connection name="OMSA Profile B" id="{Profile B GUID}"
      connectionClass="server" tryOrder="1" required="yes" onDemand="no" />
    <connection name="OMSA Profile C" id="{Profile C GUID}"
      connectionClass="server" tryOrder="1" required="yes" onDemand="no" />
    <connection name="OMSS Profile Y" id="{Profile Y GUID}"
      connectionClass="storage" required="no" onDemand="no" />
    <connection name="OMSS Profile Z" id="{Profile Z GUID}"
      connectionClass="storage" required="no" onDemand="no" />
    <connection name="Perfmon" id="{Perfmon Connection 1 GUID}"
      required="no" connectionClass="perfmon" onDemand="yes" />
  </trySession>
</session>
```

FIG. 5

```xml
<?xml version="1.0" encoding="utf-8" ?>
<connection name="OMSA" id="{OMSA Connection 1 GUID}">
  <tryConnection tryOrder="1" protocolPluginId="{SNMP Protocol Plugin GUID}"
    protocolMapperId="{SNMP Protocol Mapper GUID}" tryMapperDSFId="{OMSA
    SNMP Try Mapper DSF GUID}" mapperDSFId="{OMSA SNMP Mapper DSF
    GUID}" connectionNamespace="NA">
    <connectionCriteria index="1" optional="no" operator="=">
      <key>AgentName_guid</key>
      <value />
    </connectionCriteria>
  </tryConnection>
  <tryConnection tryOrder="2" protocolPluginId="{WMI Protocol Plugin GUID}"
    protocolMapperId="{WMI Protocol Mapper GUID}" tryMapperDSFId="{OMSA
    WMI Mapper DSF GUID}" mapperDSFId="{OMSA WMI Mapper DSF GUID}"
    connectionNamespace="NA">
    <connectionCriteria index="1" optional="no" operator="=">
      <key>AgentName_guid</key>
      <value />
    </connectionCriteria>
  </tryConnection>
</connection>
```

*FIG. 7*

```xml
<?xml version="1.0" encoding="utf-8" ?>
<mapper mapperClassId="{SNMP Protocol Mapper Plugin GUID}
  mapperSectionId="{OMSA SNMP Mapper DSF GUID}" description="" profile="OMSA
  SNMP" subprofile="">
<!-- Global variables -->
  <mapperVariables>
    <variable name="enterpriseOid"
      type="PPA::String">.1.3.6.1.4.1.674.10892</variable>
  </mapperVariables>
  <containerDefinition ufKey="OSInfo" guid="OSInfo_guid">
    <mapperVariables>
      <variable name="protocolCommand"
        type="PPA::String">GetTable</variable>
      <variable name="table" type="PPA::String">.1.400.10</variable>
    </mapperVariables>
    <protocolOperation priority="1">
      <variable name="protocolCommand"
        type="PPA::String">GetTable</variable>
    </protocolOperation>
    <attributeDefinition ufKey="OSStatus" guid="OSStatus_guid"
      type="PPA::String" category="OS Info" description="OS Status">
      <mapperVariables>
        <variable name="attribute" type="PPA::String">.1.4</variable>
      </mapperVariables>
      <mapperDataFormatter dataFormatterId="{unifyStatus_guid}"
        direction="fromPlugin" />
    </attributeDefinition>
    <attributeDefinition ufKey="OSName" guid="OSName_guid" type="PPA::String"
      category="OS Info" description="OS Name">
      <mapperVariables>
        <variable name="attribute" type="PPA::String">.1.6</variable>
```

*FIG. 8A*

```xml
    </mapperVariables>
    <mapperDataFormatter dataFormatterId="{replaceStr_guid}"
      direction="fromPlugin" />
  </attributeDefinition>
  <attributeDefinition ufKey="OSRevision" guid="OSRevision_guid"
    type="PPA::String" category="OS Info" description="OS Revision">
    <mapperVariables>
      <variable name="attribute" type="PPA::String">.1.7</variable>
    </mapperVariables>
  </attributeDefinition>
</containerDefinition>
<containerDefinition ufKey="NetworkDevice" guid="NetworkDevice_guid"
  category="Network Device">
  <mapperVariables>
    <variable name="protocolCommand"
      type="PPA::String">GetAttributes</variable>
    <variable name="table" type="PPA::String">.1.1100.90</variable>
  </mapperVariables>
  <protocolOperation priority="1">
    <variable name="protocolCommand"
      type="PPA::String">GetTable</variable>
  </protocolOperation>
  <attributeDefinition ufKey="MAC" guid="MAC_guid" type="PPA::Binary"
    description="MAC address">
    <mapperVariables>
      <variable name="attribute" type="PPA::String">.1.15</variable>
    </mapperVariables>
    <mapperDataFormatter dataFormatterId="{macConversion_guid}"
      direction="fromPlugin" />
  </attributeDefinition>
</containerDefinition>
</mapper>
```

FIG. 8B

METHODS AND MEDIA FOR A PROTOCOL ABSTRACTION LAYER FOR INFORMATION HANDLING SYSTEMS

BACKGROUND

1. Technical Field

The present disclosure relates generally to the field of information handling systems. More specifically, but with limitation, the disclosure relates to a protocol abstraction layer.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the number of communication standards and different types of devices in a network of IHSs continue to proliferate, several management problems may arise. There may be multiple methods of communicating with a remotely managed device, including the use of multiple agents or providers to transmit data. Each of the agents or providers may support one or more communication protocols, such as simple network management protocol (SNMP), windows management instrumentation-common information model (WMI-CIM), web services for management (WS-MAN), common information model-extensible markup language (CIM-XML), and other, more proprietary structured protocols.

In order to properly manage a network, an administrator may require significant knowledge of each of the variety protocols. Further, several additional problems may arise as a result of the complexity of the network. For example, within different generations of devices, one agent/provider may be preferred over another agent/provider. Based on the version or availability of protocols utilized by the agents/providers, the preference may also change. In some situations, several agents/providers on one device may provide the same data utilizing the same or different protocol or perhaps varying details of the data over different protocols, further complicating the process and potentially increasing network bandwidth usage. Due to network or other restrictions imposed by the administrator, one protocol may be restricted over another protocol, but the agent/provider may support data retrieval over either protocol. Therefore, it is possible that the best known method may not be used to retrieve the data needed. It is apparent from the issues that may arise that an administrator may require significant knowledge of a network and the protocols utilized to properly and efficiently manage resources.

Thus, a need exists for methods and media for providing an abstract interface utilizing a layered architecture that allows applications to retrieve data from remote devices utilizing various communication protocols. Based on a predetermined set of rules, a management console may connect to a preferred agent/provider utilizing a preferred protocol, therefore reducing the burden on an administrator to make such determinations.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for communicating with remote devices. The method includes sending a request through an application programming interface (API), formatting the request, and routing the request to a first connection associated with a first protocol. The request is mapped into a first command, wherein the first command conforms to the first protocol, and the first command is sent to a remote device.

Another aspect of the disclosure provides a computer-readable medium having computer-executable instructions for performing a method for communicating with remote devices. The method includes sending a request through an application programming interface (API), formatting the request, and routing the request to a first connection associated with a first protocol. The request is mapped into a first command, wherein the first command conforms to the first protocol, and the first command is sent to a remote device.

Yet another aspect of the disclosure provides a method for communicating with remote devices. The method includes registering a callback through an API and subscribing to asynchronous data from a remote device through the API. The asynchronous data is provided from the remote device to a first formatter wherein the first formatter translates the asynchronous data from a protocol domain to an application domain. The asynchronous data is provided to the callback.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein:

FIG. 5 provides an illustrative implementation of a session device support file;

FIG. 7 provides an illustrative implementation of a connection device support file;

FIG. 8 provides an illustrative implementation of a mapper device support file;

DETAILED DESCRIPTION

Before the present methods and media are described, it is to be understood that this disclosure is not limited to the particular methods and media described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a device" may refer to one or several devices, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
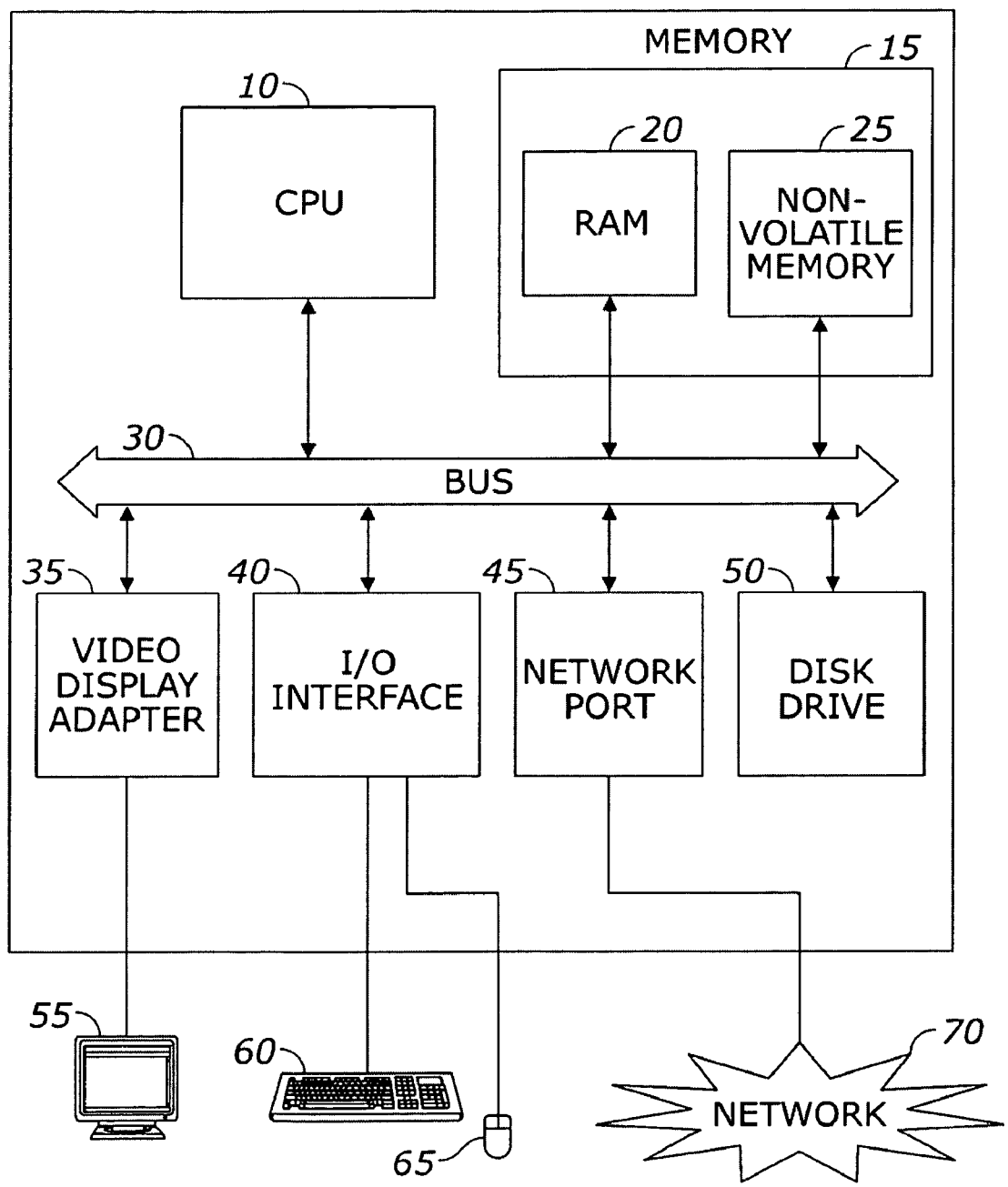
FIG. 1 represents an illustrative schematic of an information handling system (IHS) in accord with the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Within a network of IHSs, an IHS may retrieve data from a remote device, such as servers, clients, printers, tapes, storage arrays, ethernet/FC (fibre channel)/KVM (keyboard video mouse) switches, and any other suitable device that is capable of communicating data. A communication protocol may specify a particular manner in which data may be formatted and organized in order to communicate with a remote device. Because there may be numerous communication protocols or schema and several agents or providers utilizing the protocols, managing communications in the network of IHSs may become cumbersome and difficult. For example, manufacturers, associations, and/or organizations may define protocols and/or communication payload formats utilized for communication between particular devices in a network, such as simple network management protocol (SNMP), web services for management (WS-MAN), windows management instrumentation (WMI), intelligent platform management interface (IPMI), internet control message protocol (ICMP), and common information model XML (CIM-XML). Several different agents or providers utilizing different protocols may be required to allow the IHS to retrieve various types of data from remote devices.

As the number of devices and protocols in a network increase, management of communication within the network may become increasingly burdensome. Administrators may be required to be familiar with numerous protocols to manage data communication between IHSs and devices in the network. In order to simplify network communication, a protocol abstraction layer (PAL) may present a layered architecture shielding applications from the numerous communication protocols utilized to retrieve data from remote devices. For example, an application utilizing the PAL architecture may be primarily focused on making requests for specific data items and not be concerned with exactly how the data items are retrieved. The PAL architecture may be responsible for routing the request to a particular agent or provider through a preferred protocol. The PAL architecture may accomplish this by storing the agent's data schema (also known as metadata) in the mapping layer's device support files (DSFs)—a connection's mapper may be queried to see if the data requested can be provided by that connection. If a match is found, the connection may be used to retrieve the data. As an added optimization, the PAL architecture can perform a search through offline connections, as well as online connections. The search may be optimized further by supporting a discovery mode, in which the PAL will perform, upon command, a discovery of supported protocols, sessions and connections by a device, and produce a report to the consuming application, which can be provided back to the PAL at a later time when establishing a session to the device. As a result, the sessions may be optimized to make only the connections that are needed to service data requests. Further, the PAL architecture may enable extensibility by allowing new protocol plugins and mappers to be added to the framework or by updating device-specific configuration files (e.g., DSFs) to provide new agent support via an existing protocol plugin and mapper.

Figure 2:
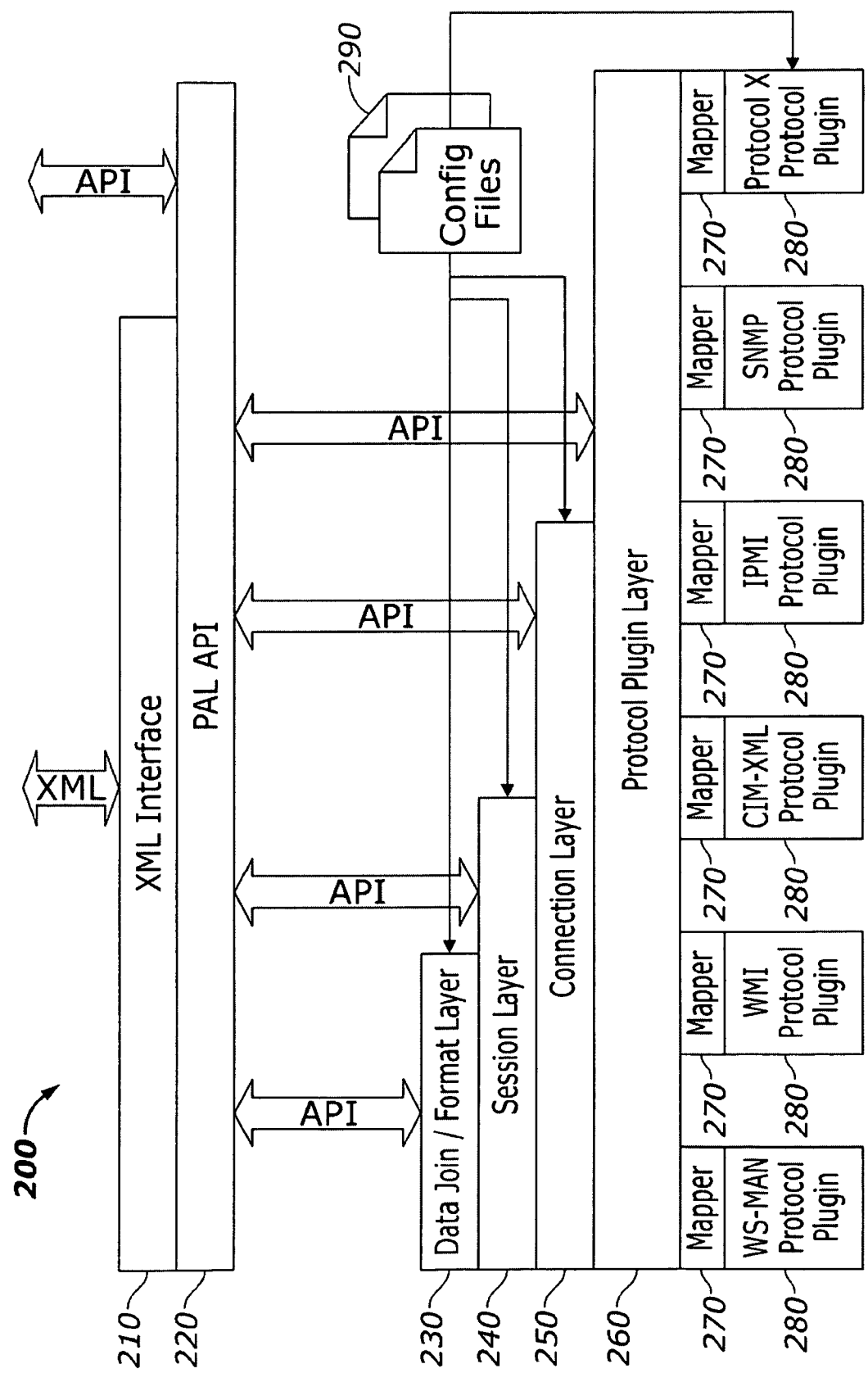
FIG. 2 provides an illustrative implementation of the different layers in a Protocol Abstraction Layer (PAL) architecture.

FIG. 2 provides an illustrative implementation of the different layers in the PAL architecture. While the layers of the PAL architecture may be discussed in sequence, the present disclosure is in no way limited to the exact data flow path in which the layers are discussed. As a result of the various protocols and formats the PAL architecture may handle, the path of data may vary for different protocols and formats. The path of data may follow any path discussed herein or any other suitable path. The PAL architecture indicated generally at 200 may enable extensibility by allowing developers of devices or agents to provide device configuration files to drive the various layers of the architecture or add new protocol plugins and mappers to provide data to the various layers of the architecture. The layers of the PAL architecture 200 may include a XML interface layer 210, a PAL API layer 220, a data join/format (DJ/F) layer 230, a session layer 240, a connection layer 250, a protocol plugin layer (PPL) 260, protocol mapper(s) 270, and protocol plugin(s) 280. The PAL architecture 200 may also include several device configuration files 290 which may be utilized by several of the layers to process commands, as discussed in detail herein. The configuration files 290 may provide processing information to each layer indicating how data may be processed for a specific protocol. While the present disclosure provides several implementations in which the configuration files 290 are XML files, the configuration files 290 may utilize any suitable language.

A PAL application programming interface (API) 220 or a XML interface 210 may be utilized to perform commands or requests, such as connecting to remote agents, retrieving data, subscribing to asynchronous data (e.g., events), and performing other actions requiring the use of a particular protocol. An XML interface layer 210 may provide an XML interface to the underlying PAL API calls. The calls and data may be serialized/deserialized from XML into PAL API calls or vice versa. Since the XML interface layer 210 is at the top end of the architecture, it may be deemed a PAL interface. A PAL API layer 220 may be the main interface point for consumers who want to interact with the various layers below it when XML is not utilized. The PAL API layer 220 may allow a client to initialize the PAL, open/close sessions, send commands, and perform various additional tasks (e.g., subscription to alerting).

Figure 3:
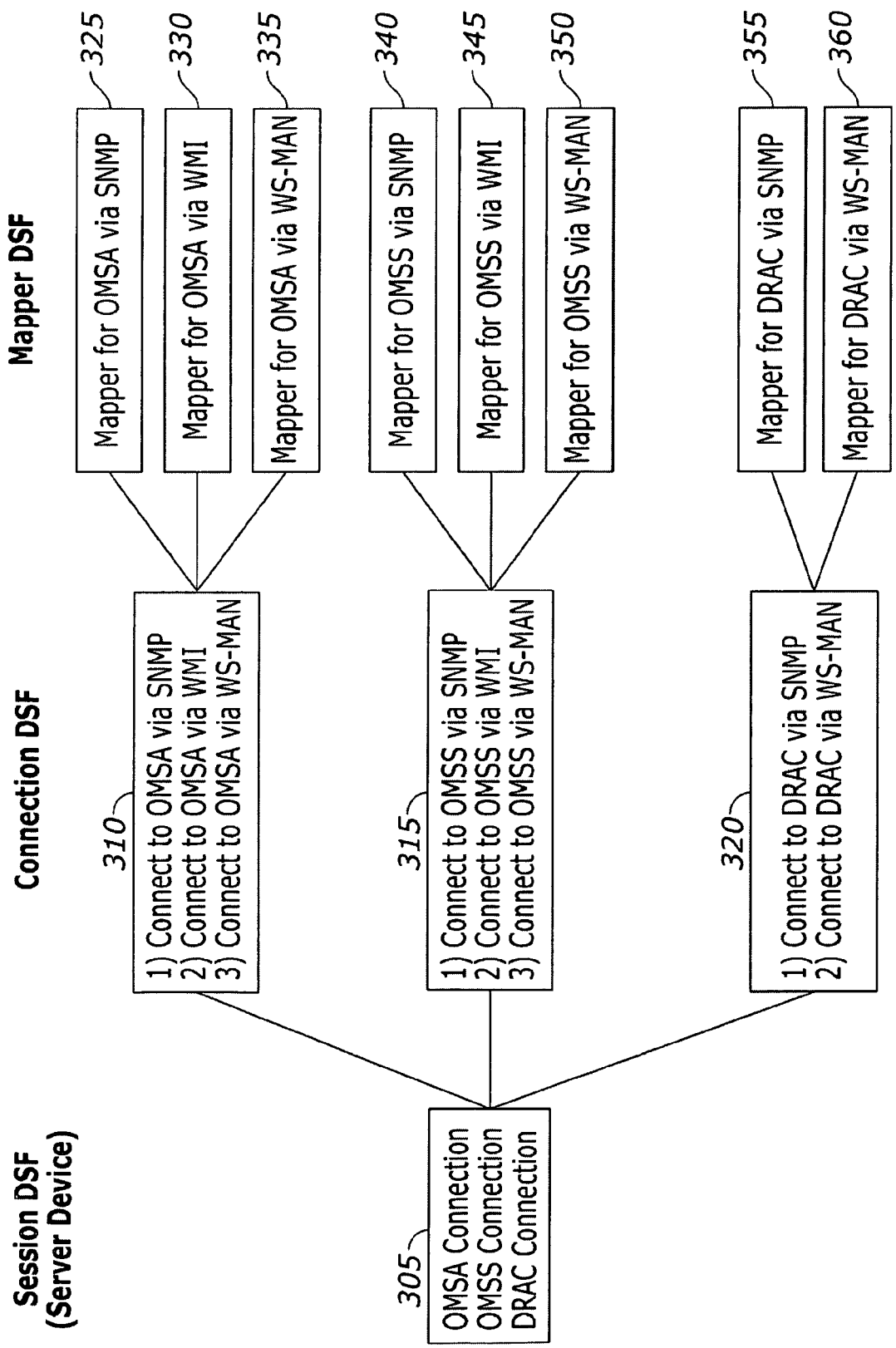
FIG. 3 provides an illustrative implementation of device support files and their relationship with each other.

Each layer in the PAL may utilize device support files (DSFs or configuration files) to properly service calls from the XML interface 210 or the PAL API 220. FIG. 3 provides an illustrative implementation of some of the different types of device support files and their relationship with each other. Device support files (DSFs) may control (1) how commands are routed to their respective connection, (2) how connections are made to service commands, (3) how commands are potentially broken-up into other commands, with their data being re-joined into the final results for the original command, (4) how synchronous/asynchronous formatting of data is performed, and (5) how data requests are translated into their protocol equivalents.

In order to optimally connect to the remote device, a hierarchy of configuration files, known as device support files (DSFs), may be utilized by several layers of the PAL. A session DSF 305 is a top level file which may logically group connections together by agent type, such as server agent, storage agent, and out-of-band controller agent. For instance, the session DSF 305 may include an OpenManage™ Server Administrator (OMSA) connection, an OpenManage™ Storage Services (OMSS) connection, and a Dell Remote Access Controller (DRAC) connection. A unique combination of these various agents may roughly describe a particular device type, such as a server, switch, or client. A connection DSF 310, 315, 320 can be linked to one or more entries in a session DSF file. The connection DSF may describe ways to connect to a particular agent utilizing one or more protocols. For example, the first connection DSF 310 and the second connection DSF 315 indicate that agents, such as OMSA and OMSS, may utilize SNMP, WMI, or WS-MAN protocols to connect to the server device. Further, the order in which the connections are listed may indicate a preferred connection order. For instance, in the third connection DSF 320, a connection to the DRAC utilizing SNMP may be preferred over a connection utilizing WS-MAN. Once a connection is made to an agent, a mapper DSF 325-360 corresponding to the connection may be selected. A mapper DSF file 325-360 may correspond to a particular agent's schema via a particular protocol and may specify the actual translation of commands and metadata back-and-forth between an application domain and a protocol domain. The mapper DSF may be an important reference for connections which may be utilized to determine whether or not a command can be serviced by a particular connection.

Returning to FIG. 2, a data join/format (DJ/F or DF) layer 230 may provide a central location for formatting data for both synchronous and asynchronous calls in the PAL. The DJ/F layer 230 may adjust commands in a consuming application's schema to an agent or provider schema through data joins/formatting or perform the opposite operation. Additionally, the DJ/F layer 230 may perform data formatting to normalize the data coming from or going to different agents/providers. Essentially the DJ/F layer 230 may convert or normalize data being transferred between the consuming application and the agent. When the DJ/F layer 230 receives a command, configuration files 290 may indicate if data joins/formatting/filtering is necessary. The DJ/F layer 230 may be called at several parts of the architecture where data flows up and/or down. For instance, the DJ/F layer 230 may be called when a command enters the PAL in order to split the command across multiple connections, to join data from multiple connections, or perhaps to filter data from multiple connections. In another instance, the DJ/F layer 230 may be called from the mapper level to split a command into two commands in order to join data from two different areas of the schema—the call may be handled from the mapper layer as it has the exact schema knowledge of the agent communicating with a consuming application. The DJ/F layer 230 may utilize multiple plugins which can support various functions, and the plugin that is called may be dependent on the DJ/F configuration files. Additionally, the DJ/F layer 230 may support the chaining of operations, such as a join, followed by a filter, followed by a formatting operation. For asynchronous operations, the PAL API 220 may allow a consuming application to register one or more callbacks for asynchronous alerts or data, and the DJ/F layer 230 may normalize the asynchronous data using a DJIF formatting plugin. In addition to providing a way to register callbacks, the PAL API 220 may allow a consuming application to subscribe for alerts from a set of agents. The PAL 200 may allow for a combination of callback registration and subscription calls to define a path for data normalization through a predefined set of DJ/F 230 plugin operations, where the definition may be determined through one or more DSF files and/or connections made during the subscription process.

Figure 4:
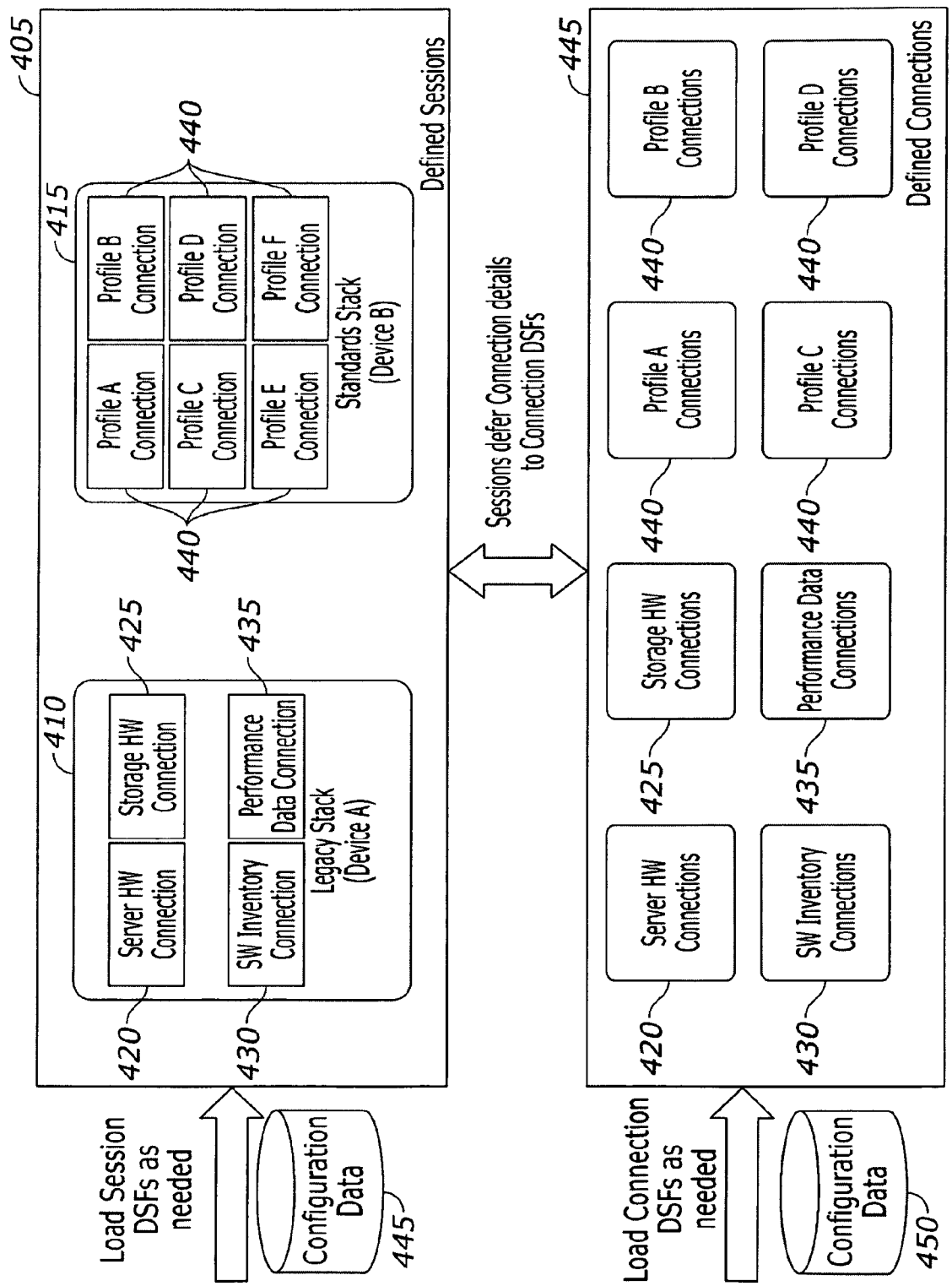
FIG. 4 represents an illustrative implementation of multiple sessions and connections.

A session layer 240 may supply an approach for logically grouping connections in the connection layer 250 by device. A session manager (SM) may manage a repository of sessions in the session layer 240 as a result of open session calls. FIG. 4 represents an illustrative implementation of multiple sessions and connections. A session may encapsulate one or more connections to a device via a single internet protocol (IP) address and may be equivalent to a known combination of connections for a particular device type. Each PAL connection object may represent a connection to one agent utilizing one specific protocol or protocol connection. Several defined connections 445 may be utilized to define a plurality of sessions 405. Session DSFs 445 and Connection DSFs 450 may be utilized to configure the sessions and connections. Connections represented in a session may be complementary of each other, with little overlap of data between the connections. For example, complementary agents may include a server hardware agent 420, a storage hardware agent 425, a software inventory agent 430, and performance data agent 435. Agents that fit into broad categories may sometimes be placed into corresponding classifications, such as main hardware agents, storage hardware agents, and software agents, which may be referred to as "connection classes" in the PAL. Classifications may also include management profiles 440, such as those defined in the Distributed Management Task Force (DMTF) System Management Architecture for Server Hardware (SMASH), Desktop and mobile Architecture for System Hardware (DASH), and Storage Networking Industry Association (SNIA) working groups.

A session DSF may represent one or more methods for connecting to a device. Within a session DSF there may be one or more session groups, and each session groups may represent a group of connections that may be supported a certain generation or configuration of the device. For instance, a session may be grouped by a complementary set of "legacy" agents (e.g., server HW, storage HW, SW inventory, and performance data connections) into a "legacy" stack 410 versus a newly developed complementary set of "standards" agents 440 into a "standards" stack 415. Because the PAL may use the group of connections within a session to search for data to fulfill command requests, it is important to group connections within a session which have a likelihood of existing on the same device at the same time through the agents/providers for the device. The makeup of a session can be dependent on several factors, but should generally represent a desired combination of connections which represent a complete coverage of the data available for the particular device's generation or configuration. One or more connections which are part of a session group may be designated as required for the session to be valid. These connections may provide a validation of a minimum configuration of agents on the remote device. For example, a legacy agent connection can validate the establishment of a legacy group of connections while a standards agent connection can validate the establishment of a standards group of connections. For a valid connection to be established, the appropriate protocols should be enabled and configured correctly by the administrator, and any connection criteria which may be optionally specified by the connection should be met as well. Connection criteria may refer to one or more expected request/response sequences between the PAL and an agent.

Before a session is started, the PAL may perform a discovery setup to determine the protocols and sessions supported by a device. The discovery setup may utilize a connection profile to generate a device support mask (DSM). A Connection Profile (CP) instance brings together or links a set of protocol settings for several possible configurations, which is configured by the administrator. The PAL, in a discovery mode, may utilize the CP in conjunction with the device support files (DSFs) to generate a DSM to be used at a later time. The DSM may apply to a single IP and may speed-up subsequent establishments of sessions with the device when the PAL is not in discovery mode. When an open session call is made to the PAL, the PAL may enumerate one or more internet protocol addresses (IPs) and may search for a successful session that can be created from the list of sessions in the DSM. Once all mandatory connections for a session are made, the search stops and the open session call returns successfully for that IP. If a different CP other than that which created the DSM is supplied or a different DSM other than that created by the CP is supplied to the open session call, then an overlay of the protocols enabled in the CP and the protocols detected in the DSM is performed to find a valid set of protocols that can be used for a connection. To provide an abstracted way to communicate with different agents, which are bound to different IPs for a device, while still allowing the consuming application to use the same session id, the PAL may allow for linked sessions, whereas sessions made automatically by the PAL to service data requests from the consuming application may be linked to the original session opened by the consuming application. Should data requests from a consuming application be fulfilled by more than one session, the PAL may keep track of previous data requests and their success in order to optimize subsequent data requests.

FIG. 5 provides an illustrative implementation of a session device support file (DSF), which a device support developer may provide for the establishment of a session. While the implementation of session DSF and other DSFs discussed herein may utilize XML, any suitable language may be utilized. A session DSF file may contain one or more "trySession" sections. In some cases, only one session can be established at any one time to a particular IP. The "trySession" sections may be prioritized from most desirable to least desirable. Each "trySession" section may represent a valid configuration of agents on the remote device. Within each "trysession" section, there may be a group of connections, each representing a different agent on the device. Each connection may include a "connection name", providing an informal label for the connection, and an "id", providing an identifier for the connection. Each connection may also be classified into a "connectionClass" that provides a general class or device type of the connection (e.g., server, storage, remote access, performance monitoring, etc.). A "tryorder" may or may not be specified for a connection, which indicates the order that the connections should be attempted in. Some connections may be specified as "mandatory" or "required" connections, which may be required to be made for the "trySession" section to be valid. The connections which are "required" may be established when the session is opened. Other connections may or may not be designated as "onDemand" connections, which may be non-mandatory connections. Non-mandatory connections may be connections to agents which may or may not be made (e.g., the agent is not present or some other connection error) when the session is opened, however they are not mandatory for the session to be established. On demand connections may be made when data requested by a consuming application requires the connection (s). Connections which are not on demand may be made at session creation time, but may not be required to be made for successful establishment of the session. Should data requests from a consuming application be fulfilled by more than one connection, the PAL may keep track of previous data requests and their success in order to more optimally and successfully fulfill subsequent data requests.

Figure 6:
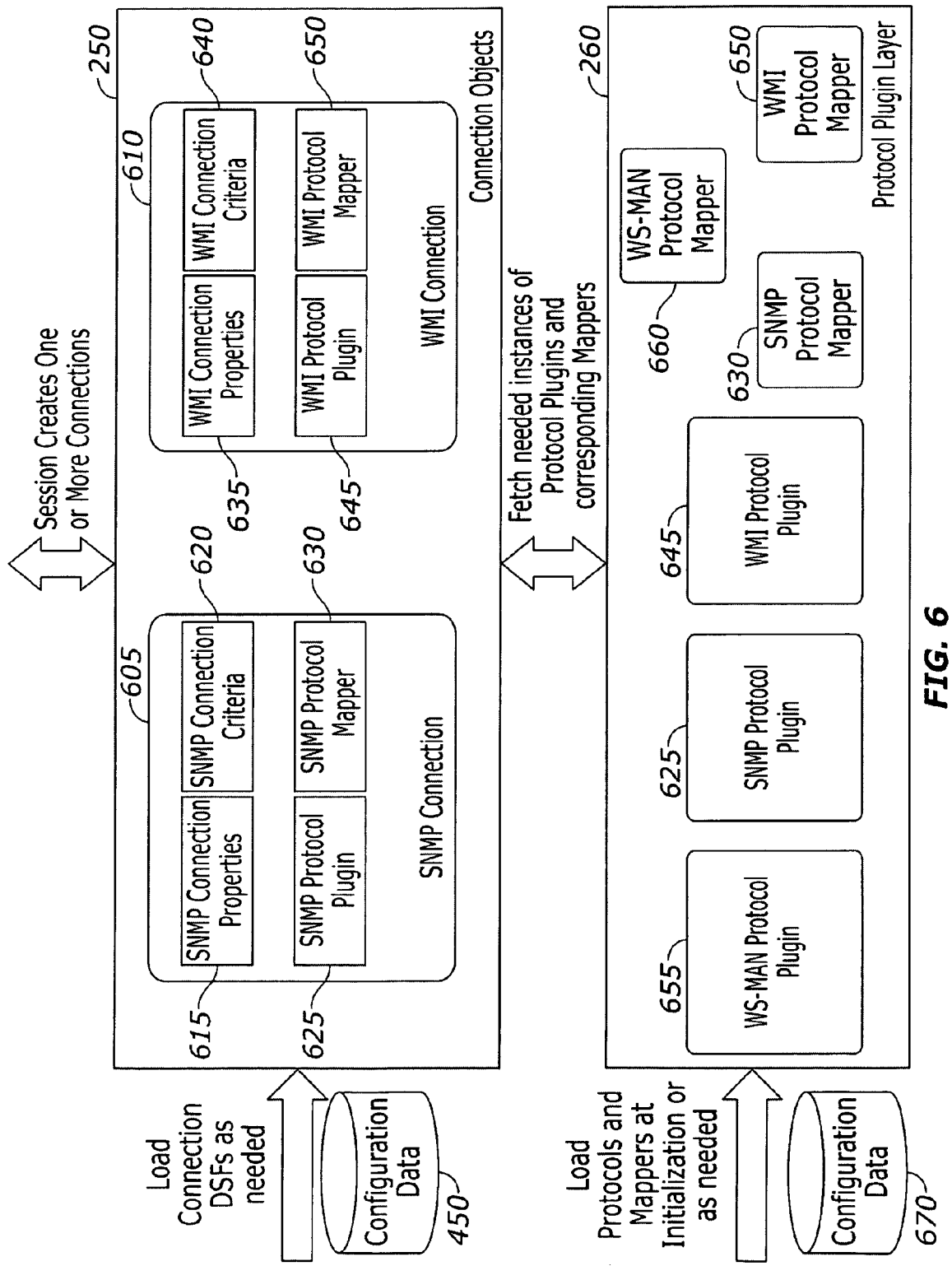
FIG. 6 represents an illustrative implementation of the composition of connection objects.

FIG. 6 represents an illustrative implementation of the composition of connection objects. A connection layer 250 may include several connection objects 605 and 610 to make connections to remote agents, handle data requests and commands, and to determine how to route specific data requests and commands to specific connections. A connection object in the PAL may represent a connection to one agent or provider via a particular protocol. Each connection object may include connection properties 615 and 635, connection criteria 620 and 640, a protocol plugin 625 and 645, and a mapper 630 and 650. For example, a SNMP connection object 605 may include SNMP connection properties 615, SNMP connection criteria 620, a SNMP protocol plugin 625, and a SNMP mapper 630. Connection properties may indicate how the protocol plugin may be configured to connect to the remote agent, including credentials and timeouts/retries. Connection criteria may provide criteria that should be met in order to establish a connection utilizing a particular protocol. Instances of protocol plugins and corresponding mappers may be fetched from the PPL 260. During establishment of a connection, connection criteria may be specified in a way that is mapped to the protocol domain, as specified by using the "try mapper" DSF id, or criteria may be protocol-specific requests (no mapping is performed). Additionally, the connection layer 250 may support, through an external connection DSF files 290, the prioritization of different methods utilized to connect to a remote agent (e.g., "try connection" sections) in order to obtain the best connection for the device.

When establishing a connection to a particular agent utilizing a particular protocol, there may be many considerations: (1) the protocol availability (installed) within the PAL, (2) selection of the protocol in the connection profile (CP), (3) whether the protocol is blocked on the network, (4) whether the agent (or agent framework) supports the protocol, (5) the presence of suitable parameters (such as credentials) supplied to make a successful connection via the protocol to the remote agent, and (6) criteria needed to be fulfilled by the agent in order to meet the requirements of the connection request. Given all these possibilities, it is not unexpected that a connection enumerated in a session DSF may lead to a connection DSF 450 file with several entries. Each entry may call out different connection possibilities with varying protocols and connection criteria.

FIG. 7 provides an illustrative implementation of a connection DSF. For each connection possibility in a connection DSF, a tag for the protocol plugin (e.g., "protocolPluginId") and connection namespace (e.g., "connectionNamespace") may be mandated, along with several optional parameters. As in the session DSF, a tryOrder tag may indicate a preferred connection order from most to least desirable. A mapper may be optionally utilized during the establishment of the connection (e.g., "tryMapperDSFId") or after the connection has been established (e.g., "MapperDSFId" ). A tryMapperDSFId tag may allow a separate mapper XML section to be used for trying connections, rather than using the mapperDSFId XML, which may reduce XML content when trying connections. The mapperDSFId tag may identify a unique mapper XML section corresponding to the agent and protocol combination. If a mapper is not used during the establishment of the connection, then the namespace and connection criteria fields may contain protocol-specific nomenclature. The connectionCriteria tag may provide a set of one or more queries against the remote agent to determine if it is the agent for which a connection is desired. Further, an optional tag may indicate whether or not the criteria is optional or required for the connection to succeed.

Once a connection is made, if a mapperDSFId has been specified, then an instance of the mapper for a particular protocol plugin may be instantiated and pointed to in the mapper DSF indicated by the mapperDSFId tag. Otherwise, commands coming into the PAL through a top end interface may require the same protocol-specific nomenclature as if the command came from a mapper. Additional inputs to the connection process may include a CP and a DSM, which may provide information regarding supported protocols and parameters for establishing a connection. The DSM may play a role in combination with the CP in determining if an IP is capable of supporting a connection through a particular protocol. Thus, it is important that the DSM be periodically refreshed and that all desired protocols are enabled during connection discovery because a protocol may be skipped if the DSM does not indicate the protocol is supported by that IP.

FIG. 8 provides an illustrative implementation of a mapper DSF. In a mapper DSF, a "mapperClassId" matching a mapper XML to its protocol mapper plugin and "mapperSectionId" that uniquely identifies the mapper may be mandatory. A "profile" may indicate a corresponding agent or profile schema for the mapper, and a "subProfile" may provide a more specific option for future standards. The remaining content of the mapper DSF shown may be utilized to map data requests from a consuming application into protocol plugin commands and protocol metadata. Because mapping operations may be specific to a particular protocol, the mapping operations and structure for each mapper DSF may vary from protocol to protocol. The mapper DSF may contain conveniences, such as variable scoping to allow the build-up of commands and/or metadata which accompanies a command, and this scoping may be based on an agent's schema.

As shown in FIG. 2, a protocol plugin layer (PPL) 260 may provide a management layer for different protocol plugins and mappers. Each individual protocol plugin and mapper may register with the PPL 260 at initialization. The PPL 260 may provide a way to obtain an instance for a specified protocol plugin, which is registered with the PPL 260, to the layers above the PPL 260. As shown in FIG. 6, a connection class may hold a reference to its own plugin that services protocol requests (e.g., SNMP or WMI protocol). When a connection is being setup, a unique protocol id in the connection DSF will be passed to the PPL 260 to get an instance of the protocol plugin desired, which may be used in establishing a connection. If the connection is not established for one reason or another, the plugin instance may then be deleted from the connection class.

The PPL 260 may also provide an instance to a mapper that is implemented for a particular protocol plugin. To retrieve an appropriate mapper object, a call to the PPL may be made and the mapper class id, as defined in the mapper DSF, may be supplied. The mapper class id may be linked to the connection through the mapper DSF Id present in both the mapper DSF and connection DSF. Before a plugin library is loaded by the PPL 260, the PPL 260 may need to load a plugin's capabilities XML to see what tiers and operating systems are supported by the plugin. Additionally, delegation instructions which may be read from the capabilities XML to assure other plugins, which the plugin may delegate commands to, are also loadable. Plugins may delegate functions to other plugins so that functionality is consolidated across the plugins. For example, several different synchronous protocols may use SNMP traps for asynchronous reception. Therefore, plugins may wish to delegate their asynchronous functionality to a SNMP "trap listener" plugin. Should there be a case where a dependency occurs and it cannot be honored, an initialization error may occur.

Still referring to FIG. 2, a mapper 270 may provide data/metadata abstraction to the layers above it and may provide a translation layer between application-domain and protocol-domain constructs. In an application-domain, data may be provided in a format utilized by an application. In a protocol-domain, data may be provided in a format utilized by a particular agent or provider. Translation of commands may be driven by external, device-specific configuration files 290, which may contain the mapping of abstract data requests into protocol-specific requests. A mapper plugin may be unique and specifically designed for a protocol plugin due to the uniqueness of a protocol's plugin command set and structure of data.

Figure 9:
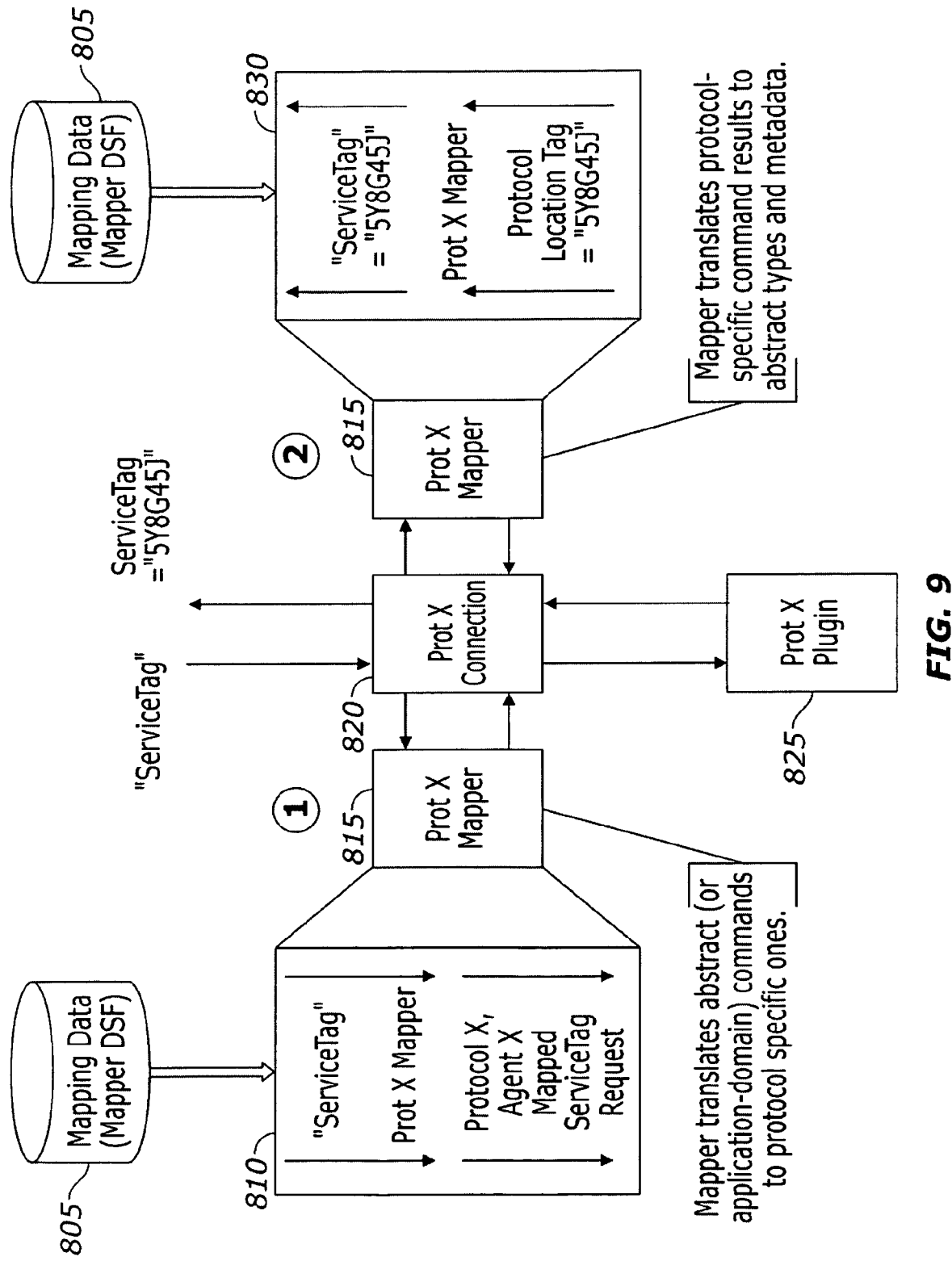
FIG. 9 represents an illustrative implementation of a mapper processing a data request.

A mapper may take PAL commands from the PAL API, along with abstract tags and data types, and converts them into protocol plugin-specific commands and protocol-specific data. A protocol plugin may abstract the protocol-specific API into a common data access interface, which a mapper may then utilize to support main PAL commands that involve the retrieval and modification of data. FIG. 9 represents an illustrative implementation of a mapper processing commands. The mapper has two main roles when processing commands for the PAL. First, for each command coming from a connection 820 coupled to a mapper 815, the mapper 815 may look up the abstract tags the command refers to in the mapper DSF 805 associated with the mapper object through the connection. XML information from the mapper DSF 805 may be used to form protocol plugin command(s) and associate protocol-specific metadata request(s) from the incoming command to formulate a new command 810 that is specific to the protocol. The connection may take the new command(s) and send it to the protocol plugin 825 so that it may be provided to a remote device.

Second, when a response returns from the remote device, the mapper 815 may take the protocol specific data and metadata contained in a command results structure (or the response) and perform a reverse-translation back into abstract tags and PAL data types to formulate a new command results structure 830 to be passed back to the connection, which will in turn attach the original command to the results and send the command results structure back up through the PAL. The PAL 200 may contain its own set of data types to bridge the difference between protocol data types and application-domain data types. The mapper may allow the conversion of data from one PAL data type to another through the specification of a data format command, which may be performed by the DJ/F layer 230. If the consuming application wishes to, it may bypass a mapper during processing of a command. In this case, it may formulate commands to the protocol plugin as the protocol mapper would.

A protocol plugin 280 of FIG. 2 may enable communication by way of a specific protocol (e.g., SNMP, WMI, ASF, etc.) to the layers above. Installed plugins may be loaded at runtime by a protocol plugin manager, contained in the PPL. The protocol plugin may wrap the protocol-specific APIs and enables the layers above it to invoke operations with a generic and abstracted command set as discussed previously. The protocol plugin may be responsible for returning protocol-specific data types as translated into PAL data types. Additionally, any protocol plugin may need to return instances of data in a way as to allow easy enumeration of data by the consuming application, no matter the protocol plugin used underneath the covers. The PAL architecture utilizes the layers to provide an interface to consuming applications which may allow communication with remote devices utilizing any protocol supported by PAL architecture. As a result, the PAL architecture may be responsible for managing, prioritizing, and selecting a communication protocol, thereby simplifying the duties of a network administrator.

Figure 10A:
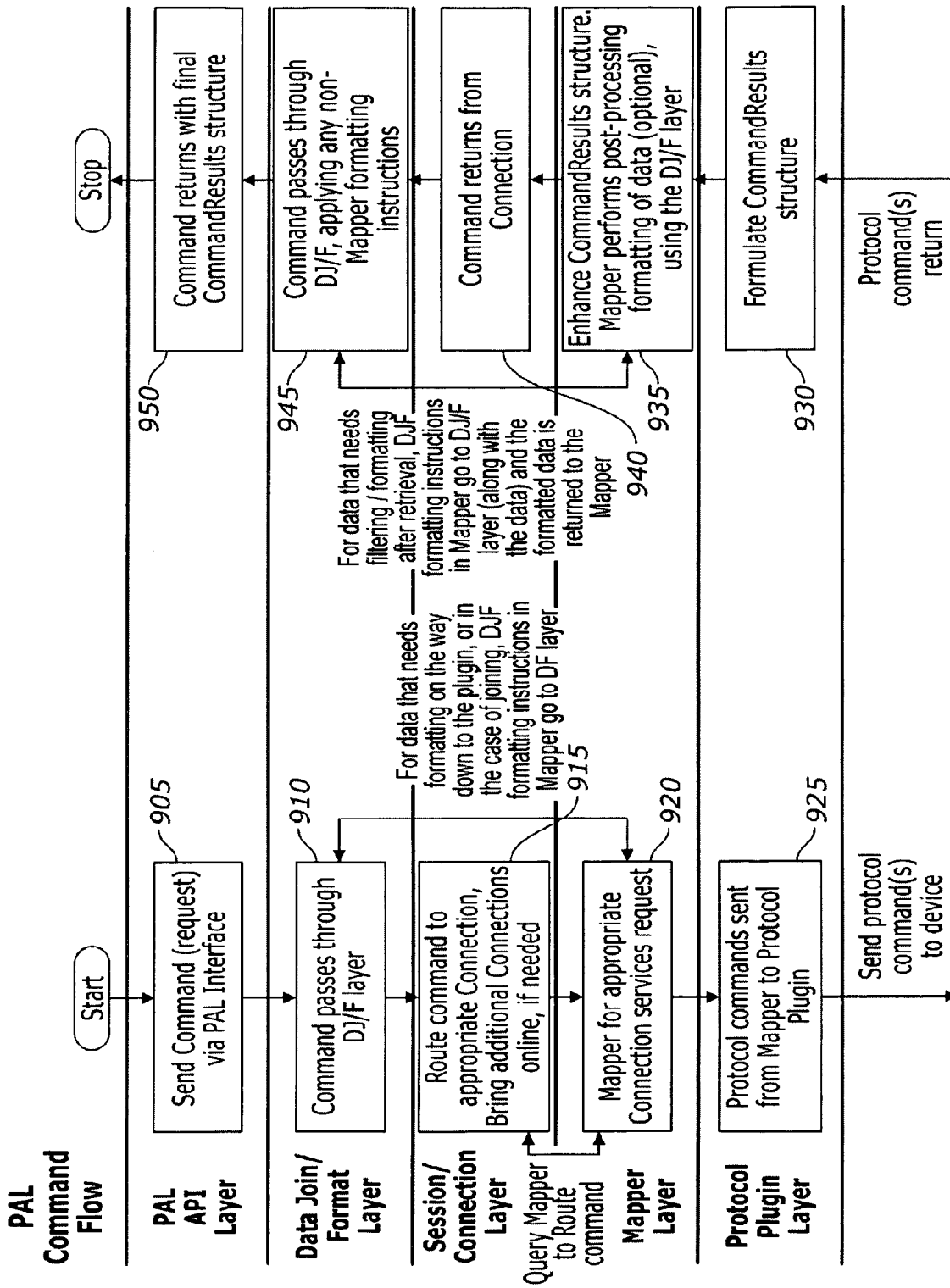
FIG. 10A provides an illustrative implementation of the flow of calls through the PAL without data joining.
Figure 10B:
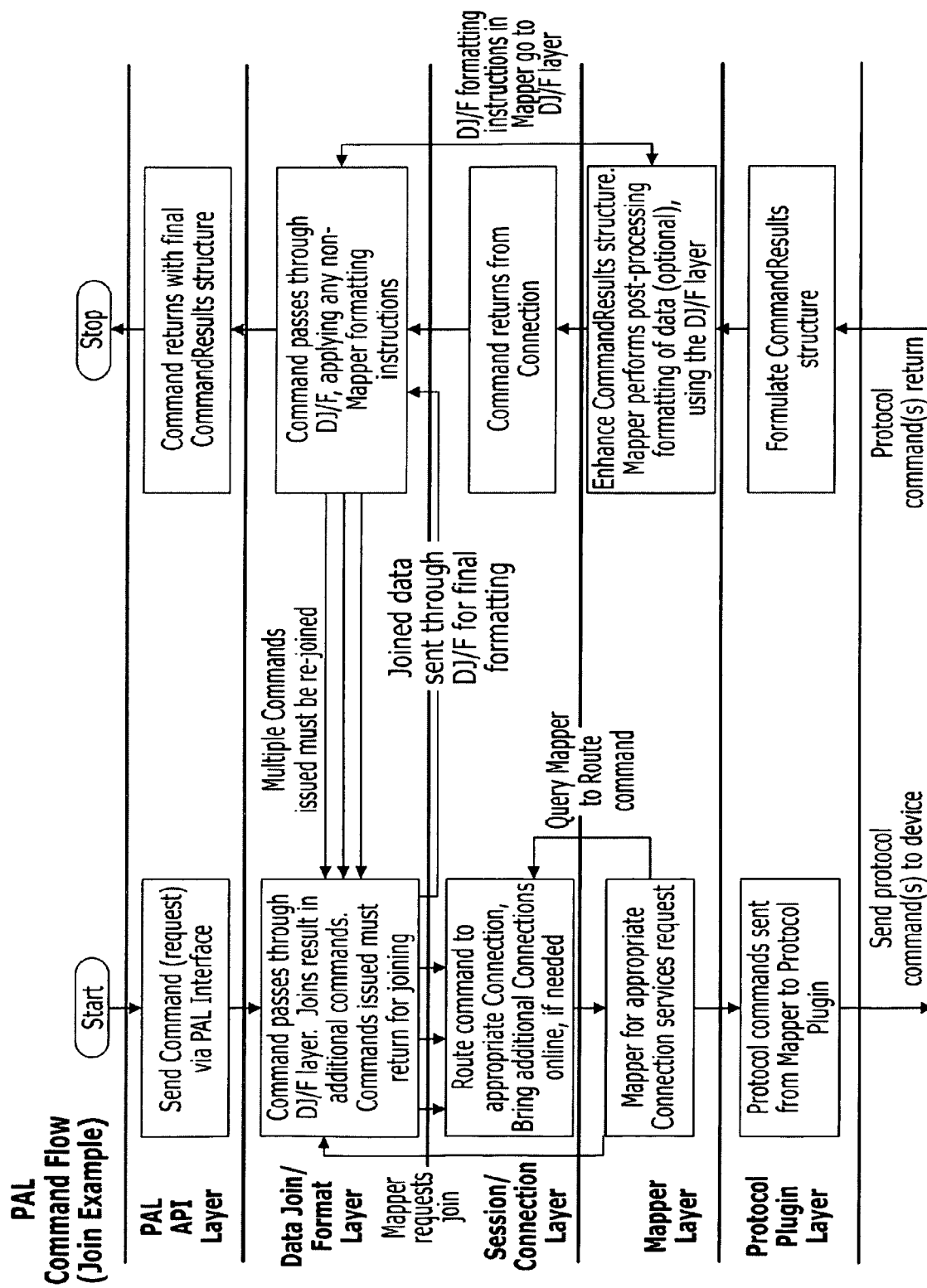
FIG. 10B provides an illustrative implementation of the flow of calls through the PAL with data joining.

FIG. 10A provides an illustrative implementation of the flow of calls through the PAL without data joins. In step 905, a command or request may be sent through a PAL interface (i.e., XML or PAL API interface) by a caller. The command or request may pass through the DJ/F layer step 910, which may perform data joins or formatting if necessary to adjust the data for the consuming application beyond what functions the mapper performs. In some cases, configuration files (e.g., DJ/F DSF) may indicate that a join should be performed across several connections, which may result in multiple commands being generated from the original command. FIG. 10B provides an illustrative implementation of the flow of calls through the PAL with data joins, which illustrates a command that may be separated into several command in step 910. In step 915, command(s) may be routed to appropriate connections, and additional connections or sessions may be brought online as needed. For each command, a query to each connection for a session may occur to determine which connection may service the requested data. Each connection may, in turn, make a similar query to its corresponding mapper to assist with the lookup. For connections that have not been made, but may be needed to service the request, a connection may be attempted. If the command requires the connections to be made and the connection cannot be made, then the command may fail or partially succeed depending on whether or not the data requests were split among connections. In step 920, the command may be processed by the mapper. For data which may require joining/formatting, the mapper may make a request back to the DJ/F layer to perform formatting on data going down to the protocol plugin or coming up from the protocol plugin. The commands may then be translated into protocol-specific commands in accordance with a mapper DSF and sent to the protocol plugin layer in step 925. Once the command is translated into protocol-specific command (s), the protocol-specific command(s) may be sent out to a remote agent or provider from the protocol plugin.

In response to the protocol-specific command(s) sent, the remote agent or provider may return a command response to the PAL in the same protocol. The protocol plugin may formulate a command results structure from the command response and may provide the command results structure to the mapper in step 930. In step 935, the mapper may enhance the command results structure by performing post processing formatting of the data, such as replacing protocol-domain data tags with application-domain data tags as indicated in the mapper DSF. Further, any formatting/filtering instructions, such as DJ/F-embedded formatting/filtering commands in the mapper DSF, may be sent to the DJ/F layer for processing before the data is handed up to the connection. The DJ/F layer may apply any non-mapper formatting instructions to the data in step 945. As shown in FIG. 10B, in the case that separate commands were generated in step 910, a command response may be re-joined with other issued command responses from the remote agent or provider and sent through the DJ/F layer for final formatting in step 945. Once all formatting is completed, the command may be returned back up to the respective connection session, and then out of the PAL to the caller in step 950.

Various methods are contemplated including all or less than all of the steps described herein and/or mentioned above, any number of repeats or any of the steps shown and/or mentioned above, and performance of the steps in any order.

Methods of the present disclosure, detailed description and claims may be presented in terms of logic, software or software implemented aspects typically encoded on a variety of storage media or storage medium including, but not limited to, computer readable storage medium/media, machine-readable storage medium/media, program storage medium/media or computer program product. Such storage media may be handled, read, sensed and/or interpreted by an IHS. Those skilled in the art will appreciate that such storage media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for communicating with a remote devices, the method comprising:
    performing a request utilizing a protocol abstraction layer (PAL) interface, wherein the PAL interface comprises an application programming interface (API);
    configuring data of the request into at least one command;
    analyzing each of the at least one command for determining a connection to the remote device;
    mapping the connection to a protocol associated with the connection utilizing a device support file (DSF) specified by the remote device; and
    communicating with the remote device through the protocol.

2. The method of claim 1, wherein the PAL interface comprises an extensible markup language (XML) interface.

3. The method of claim 1, wherein the API interacts with each of a plurality of layers of a PAL architecture.

4. The method of claim 3, wherein each of the plurality of layers of the PAL architecture utilizes the DSF for supporting requests from an XML interface or the API.

5. The method of claim 1, wherein configuring data of the request comprises joining the data after splitting the data into at least two commands.

6. The method of claim 1, wherein determining the connection to the remote device comprises selecting one connection from a set of connections grouped based on the remote device, selecting one connection comprising prioritizing a first connection over a second connection.

7. The method of claim 1, wherein analyzing each of the at least one command for determining the connection to the remote device comprises performing a discovery setup, the discovery setup utilizing a connection profile (CP) in combination with the DSF to generate a device support mask (DSM) for indicating whether a single connection or multiple connection is supported by the remote device.

8. The method of claim 1, wherein the connection comprises connection properties and connection criteria for the protocol, and instances of a protocol plugin and a mapper corresponding to the protocol.

9. The method of claim 1, wherein mapping the connection to a protocol associated with the connection comprises prioritizing a first protocol over a second protocol.

10. The method of claim 1, wherein mapping the connection to a protocol associated with the connection comprises translating the request from an application-domain command into a protocol specific command by utilizing a mapper DSF.

11. The method of claim 1, wherein mapping the connection to a protocol associated with the connection comprises managing a plugin protocol and a mapper, the plugin protocol and mapper configured to register with a management layer of a PAL architecture.

12. The method of claim 1 further comprising:
    providing an additional protocol by modifying a protocol plugin or mapper wherein modifying the protocol plugin or mapper comprises updating a DSF of each layer of a PAL architecture through an existing protocol plugin or mapper.

13. A computer-readable storage medium having computer-executable instructions stored thereon for performing a method for communicating with a remote devices, the method comprising:
    performing a request utilizing a protocol abstraction layer (PAL) interface,
    wherein the PAL interface comprises an application programming interface (API);
    configuring data of the request into at least one command;
    analyzing each of the at least one command for determining a connection to the remote device;
    mapping the connection to a protocol associated with the connection by utilizing a device support file (DSF) specified by the remote device; and
    communicating with the remote device through the protocol.

14. The computer-readable storage medium of claim 13, wherein the PAL interface comprises an extensible markup language (XML) interface.

15. The computer-readable storage medium of claim 13, wherein the API interacts with each of a plurality of layers of the PAL architecture.

16. The computer-readable storage medium of claim 15, wherein each of the plurality of layers of PAL architecture utilizes the DSF for supporting requests from an XML interface or the API.

17. The computer-readable storage medium of claim 13, wherein configuring data of the request comprises joining the data after splitting the data into at least two commands.

18. The computer-readable storage medium of claim 13, wherein determining the connection to the remote device comprises selecting one connection from a set of connections grouped based on the remote device, selecting one connection comprising prioritizing a first connection over a second connection.

19. The computer-readable storage medium of claim 13, wherein analyzing each of the at least one command for determining the connection to the remote device comprises performing a discovery setup, the discovery setup utilizing a connection profile (CP) in combination with the DSF to generate a device support mask (DSM) for indicating whether a single connection or multiple connection is supported by the remote device.

20. The computer-readable storage medium of claim 13, wherein the connection comprises connection properties and connection criteria for the protocol, and instances of a protocol plugins and a mappers corresponding to the protocols.

21. The computer-readable storage medium of claim 13, wherein mapping the connection to a protocol associated with the connection comprises prioritizing a first protocol over a second protocol.

22. The computer-readable storage medium of claim 13, wherein mapping the connection to a protocol associated with the connection comprises translating the request from an application-domain command into a protocol specific command by utilizing a mapper DSF.

23. The computer-readable storage medium of claim 13, wherein mapping the connection to a protocol associated with the connection comprises managing a plugin protocol and a mapper, the plugin protocol and the mapper configured to register with a management layer of a PAL architecture.

24. The computer-readable storage medium of claim 13, wherein the method of claim 13 further comprising:
providing an additional protocol by modifying a protocol plugin or a mapper, wherein modifying the protocol plugin or the mapper comprises updating a DSF of each layer of a PAL architecture through an existing protocol plugin or existing mapper.

25. A method of communication with a remote device, the method comprising:
registering a callback through an application programming interface (API) of a protocol abstraction layer (PAL);
subscribing to asynchronous data from the remote device through the API;
providing the asynchronous data from the remote device to a first formatter, wherein the first formatter translates the asynchronous data from a protocol domain command to an application domain command; and
returning the asynchronous data to the callback.

* * * * *